US011237255B2

(12) United States Patent
Jeong et al.

(10) Patent No.: US 11,237,255 B2
(45) Date of Patent: Feb. 1, 2022

(54) LIDAR SYSTEM (71) Applicant: LVI Technologies Inc. CO., Ltd, Yongin-si (KR)

(72) Inventors: Jaesung Jeong, Seoul (KR); Youngmin Jeong, Seoul (KR)

(73) Assignee: LVI Technologies Inc. CO., Ltd, Yongin-si (KR)

( * ) Notice: Subject to any disclaimer, the term of this patent is extended or adjusted under 35 U.S.C. 154(b) by 0 days.

(21) Appl. No.: 17/338,690

(22) Filed: Jun. 4, 2021

(65) Prior Publication Data
US 2021/0293936 A1 Sep. 23, 2021

Related U.S. Application Data

(63) Continuation of application No. PCT/KR2020/014578, filed on Oct. 23, 2020.

(30) Foreign Application Priority Data

Nov. 13, 2019 (KR) .................. 10-2019-0144798

(51) Int. Cl.
*G01S 7/481* (2006.01)
*G01S 17/86* (2020.01)
(Continued)

(52) U.S. Cl.
CPC .......... *G01S 7/4817* (2013.01); *G01S 7/484* (2013.01); *G01S 7/4815* (2013.01); *G01S 17/86* (2020.01); *G02B 19/0009* (2013.01); *G02B 19/0047* (2013.01); *G02B 26/0891* (2013.01); *G02B 26/101* (2013.01); *G02B 26/125* (2013.01)

(58) Field of Classification Search
CPC ........ G01S 7/4817; G01S 7/484; G01S 17/86; G01S 7/4815; G02B 26/125; G02B 26/0891; G02B 19/0047; G02B 19/0009; G02B 26/101
See application file for complete search history.

(56) References Cited

U.S. PATENT DOCUMENTS

| 10,775,508 B1* | 9/2020 | Rezk ..................... G01S 7/4816 |
| 2005/0024482 A1* | 2/2005 | Yonekubo ............ G02B 26/105 347/244 |

(Continued)

FOREIGN PATENT DOCUMENTS

| JP | 2003-307689 A | 10/2003 |
| JP | 2005-077379 A | 3/2005 |

(Continued)

*Primary Examiner* — Yuqing Xiao
*Assistant Examiner* — Amir J Askarian
(74) *Attorney, Agent, or Firm* — Nicholas Park (57) ABSTRACT

A light detection and ranging (LiDAR) system is provided. The present embodiment provides a LiDAR system in which side angles of a rotating polygon mirror having multiple facets are diversified to change an angle of a laser beam refracted from a side facet, thereby sensing a plurality of vertical lines at the same time. The present embodiment provides a LiDAR system which allows an object to be sensed with a circular pattern, a circular matrix pattern, or a line matrix pattern by diversifying a pattern of a laser beam oscillated due to the rotation of a rotating polygon mirror having multiple facets and a wedge prism.

20 Claims, 9 Drawing Sheets

(51) Int. Cl.
G01S 7/484 (2006.01)
G02B 19/00 (2006.01)
G02B 26/08 (2006.01)
G02B 26/10 (2006.01)
G02B 26/12 (2006.01)

(56) References Cited

U.S. PATENT DOCUMENTS

| | | | |
|---|---|---|---|
| 2007/0029471 A1* | 2/2007 | Yamaguchi | G02B 26/125 |
| | | | 250/234 |
| 2017/0038458 A1* | 2/2017 | Sugawara | G01S 7/4817 |
| 2018/0120433 A1* | 5/2018 | Eichenholz | H01S 3/0007 |
| 2018/0275282 A1* | 9/2018 | Ozbilgin | G01S 19/05 |
| 2018/0284276 A1* | 10/2018 | Campbell | G01S 7/4816 |
| 2019/0011541 A1* | 1/2019 | O'Keeffe | G01S 17/10 |
| 2019/0101645 A1* | 4/2019 | DeMersseman | G01S 17/87 |
| 2020/0025879 A1* | 1/2020 | Pacala | G01S 17/42 |
| 2020/0137330 A1* | 4/2020 | Van Dyck | G01S 17/894 |
| 2020/0158829 A1* | 5/2020 | Han | G01S 17/931 |
| 2020/0278285 A1* | 9/2020 | Berzofsky | G01N 15/1459 |

FOREIGN PATENT DOCUMENTS

| | | | |
|---|---|---|---|
| JP | 2014-071026 | | 4/2014 |
| JP | 2014-235075 A | | 12/2014 |
| KR | 10-1331789 B1 | | 11/2013 |
| KR | 10-2018-0072657 A | | 6/2018 |
| WO | WO-2009139571 A2 * | 11/2009 | G03B 17/17 |
| WO | WO-2020062718 A1 * | 4/2020 | G02B 27/0972 |

* cited by examiner

LIDAR SYSTEM

CROSS-REFERENCE TO RELATED APPLICATION

This application is a US Bypass Continuation Application of International Application No. PCT/KR2020/014578, filed on Oct. 23, 2020 and designating the United States, the International Application claiming a priority date of Nov. 13, 2019 based on prior Korean Patent Application No. 10-2019-0144798, filed on Nov. 13, 2019. The disclosure of which is incorporated herein by reference in its entirety.

BACKGROUND

1. Field of the Invention—Technical Field

The present invention relates to a light detection and ranging (LiDAR) system.

2. Discussion of Related Art

The contents described below merely provide background information related to the present embodiment and are not intended to constitute the related art.

Light detection and ranging (LiDAR) systems are systems that irradiate a laser onto an object and analyze a laser beam returning by being reflected by the object, thereby measuring and detecting a distance to the object, a direction of the object, and a speed of the object.

LiDAR systems have been used for weather observation or distance measurement, and recently, the LiDAR systems have been used for autonomous vehicles, weather observation using satellites, unmanned robot sensors, and technologies for three-dimensional (3D) image modeling.

A laser beam may be irradiated as a sine wave, a pulse wave, or the like according to a measuring method, and a LiDAR scanning device including a motor, a mirror, or the like is required to shift a measurement point of the laser beam during two-dimensional (2D) mapping or three-dimensional (3D) shape measuring.

Recently, for mobile platforms, LiDAR is in the spotlight as a sensor for measuring a surrounding shape. Among mobile platforms, for example, vehicles such as an autonomous vehicle and an unmanned moving vehicle generally travel along the ground, and thus objects to be measured are mostly present on the ground. Accordingly, LiDAR for an autonomous vehicle require less a wide measurement angle in a vertical direction but requires a wide measurement area in a horizontal direction.

In addition, since there are many objects traveling at a high speed of 100 km or more in a driving environment of a vehicle, only when a measurement speed of LiDAR is high, can the objects be detected.

In conventional LiDAR systems, in order to increase the number of vertical channels, a galvanometer or microelectromechanical systems (MEMS) scanner should be used, or a diffractive optical element (DOE), a prism, or the like capable of splitting a beam into a plurality of beams should be used.

SUMMARY OF THE INVENTION

The present invention is directed to providing a light detection and ranging (LiDAR) system in which side angles of a rotating polygon mirror having multiple facets are diversified to change an angle of a laser beam refracted from a side facet, thereby sensing a plurality of vertical lines at the same time and freely.

The present invention is directed to providing a LiDAR system which allows an object to be sensed with a circular pattern, a circular matrix pattern, or a line matrix pattern by diversifying a pattern of a laser beam oscillated due to the rotation of a rotating polygon mirror having multiple facets and a wedge prism.

According to an embodiment of the present invention, a light detection and ranging (LiDAR) system includes a first laser generator configured to generate a first laser beam having a preset wavelength, an $N^{th}$ laser generator configured to generate an $N^{th}$ laser beam having a wavelength different from that of the first laser beam, a beam combiner configured to generate a combined laser beam by combining the first laser beam and the $N^{th}$ laser beam, a rotating polygon mirror which includes a polygon-shaped mirror having pre-formed multiple facets and in which, when a laser beam is directly incident from the first laser generator or from the $N^{th}$ laser generator, the polygon-shaped mirror rotates to reflect the laser beam at a present angle of the multiple facets and vertically emit the laser beam, a wedge prism which rotates at an angle of 360° or stops to transmit the laser beam incident from the rotating polygon mirror, a first reflective mirror configured to reflect the laser beam transmitted from the wedge prism in a preset one direction and allow the laser beam to be emitted in any one pattern of a circular pattern, a circular matrix pattern, and a line matrix pattern, a light receiving lens configured to condense a return laser beam by receiving the return laser beam corresponding to any one of the circular pattern, the circular matrix pattern, and the line matrix pattern from an object positioned in an area in which the laser beam is emitted, a reflective mirror unit configured to reflect the return laser beam condensed from the light receiving lens in a preset one direction, and a sensing optics mount configured to measure a light amount of the return laser beam reflected from the reflective mirror unit, measure an image of a waveform of the return laser beam, or measure a distance to the object using a speed of the return laser beam.

DETAILED DESCRIPTION

Hereinafter, the present embodiment will be described in detail with reference to the accompanying drawings.

Figure 1A:
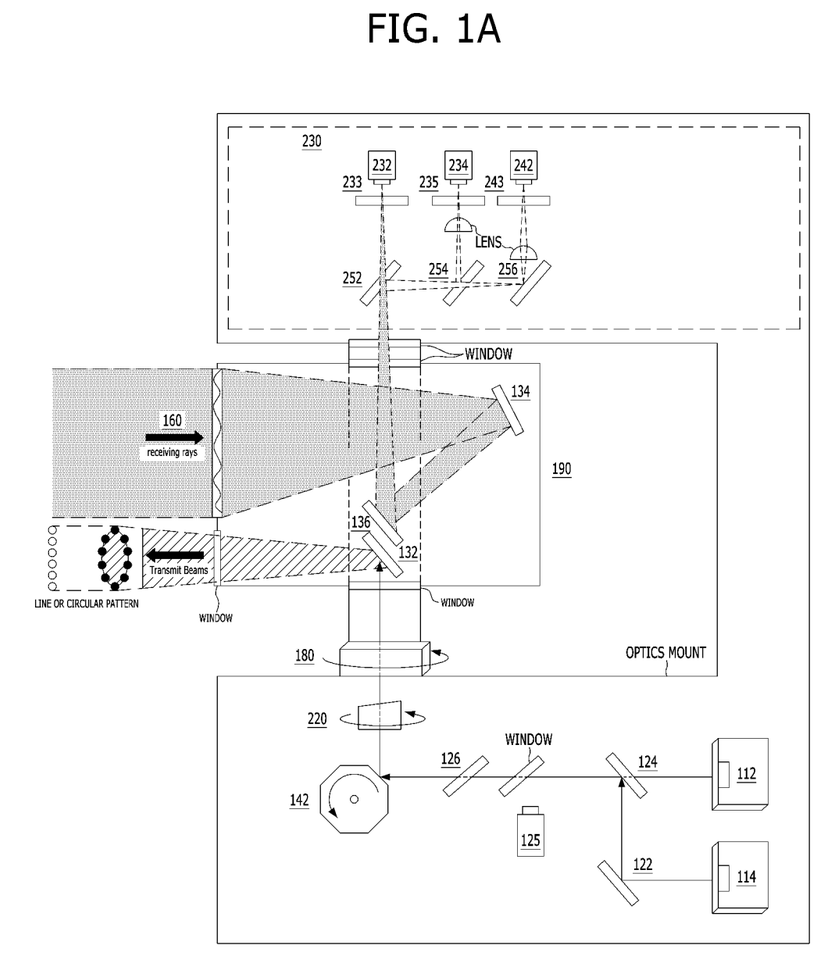
FIGS. 1A and 1B are diagrams illustrating a light detection and ranging (LiDAR) system according to the present embodiment.
Figure 1B:
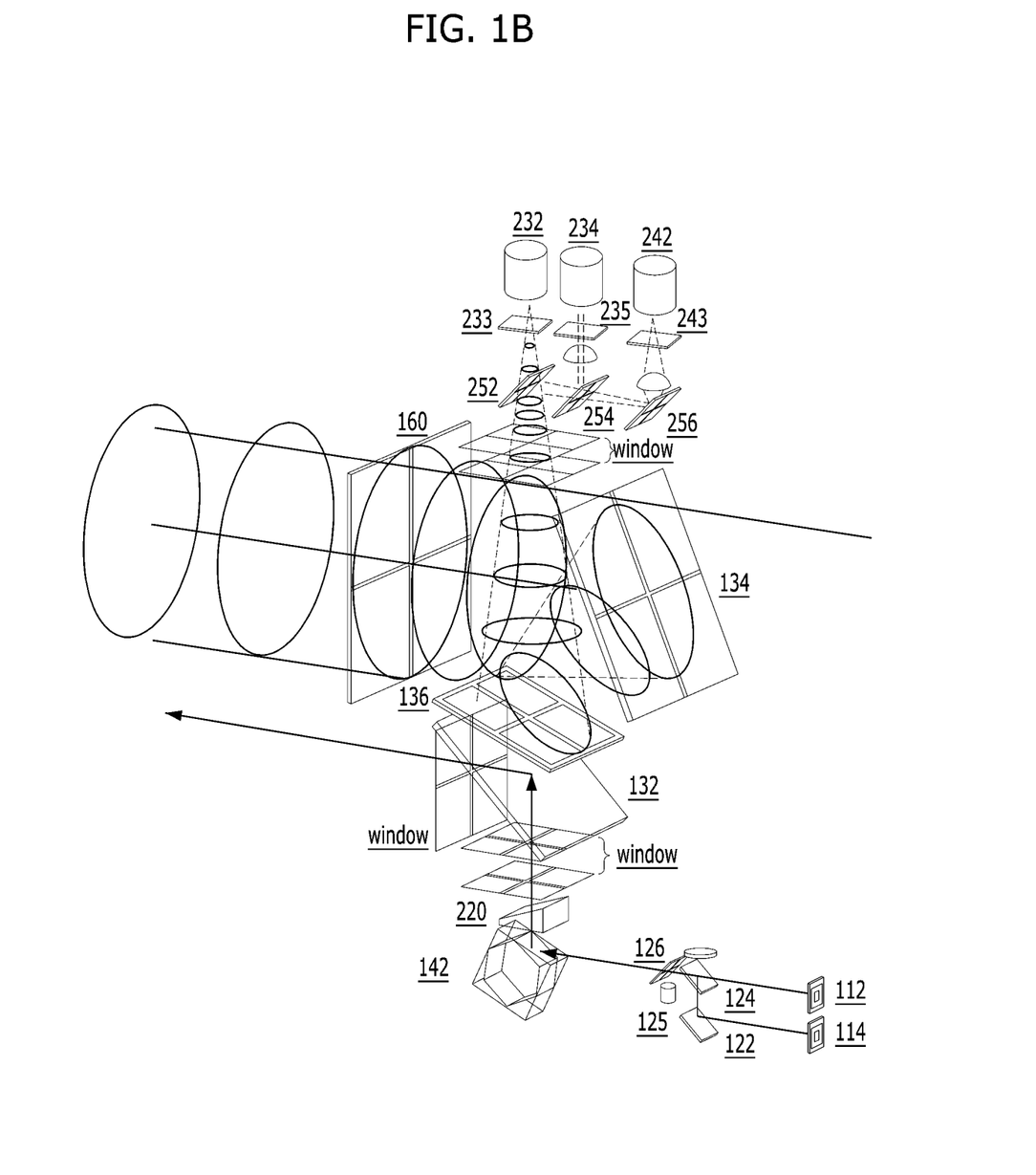

FIGS. 1A and 1B are diagrams illustrating a light detection and ranging (LiDAR) system according to the present embodiment.

The LiDAR system 100 should emit a laser beam and receive a laser signal that is coaxially reflected. The LiDAR system 100 emits a laser beam by rotating a rotating body. Emitted light is coaxially reflected and received by a photo sensor at a receiver end. The LiDAR system 100 debugs position information of a global positioning system (GPS) after accumulating data.

In the LiDAR system 100, transmitting and receiving one laser beam is referred to as one channel, transmitting and receiving two laser beams is referred to as two channels, and N channels are used.

In a general LiDAR system, when one laser beam is split into sixteen or two, energy is reduced to ½ or ¹⁄₁₆, and the laser beam being split is scanned with a rotating body. A laser and a pulse are output according to the splitting.

For the rotating body mounted in the general LiDAR system, there are a scanning method and a method of using a motor. In the general LiDAR system, horizontal scanning and its fixed vertical scanning are possible, but vertical scanning channels are not variable.

In the general LiDAR system, there are various methods of emitting a laser and receiving a reflected signal by using the manner in which the rotating body connected to a motor horizontally rotates. However, in order to scan a specific object, a pulse should be vertically emitted, and in order to vertically emit a laser, a laser beam should be split.

In the general LiDAR system, in order to split one laser beam source, a laser beam should be split by using a very complex structure using a diffractive optical element (DOE) or a prism. On the other hand, in the present embodiment, scanning is vertically performed with one laser beam source without using a DOE or a prism.

The LiDAR system 100 according to the present embodiment includes a first laser generator 112, a second laser generator 114, a reflective mirror 122, a beam combiner 124, a sensor 125, a first reflective mirror 132, a second reflective mirror 134, a third reflective mirror 136, a rotating polygon mirror 142, a wedge prism 220, a light receiving lens 160, a first filter 233, a second filter 235, a third filter 243, a first photomultiplier tube (PMT1) 232, a second photomultiplier tube (PMT2) 234, and an avalanche photodetector (APD) 242. Components included in the LiDAR system 100 are not necessarily limited thereto.

The first laser generator 112 generates a first laser beam having a preset wavelength. The first laser generator 112 generates the first laser beam having a wavelength of 905 nm, 1,064 nm, or 1,550 nm. The second laser generator 114 generates a second laser beam having a wavelength different from that of the first laser beam. The second laser generator 114 generates the second laser beam having a wavelength of 532 nm. The first laser generator 112 and the second laser generator 114 transmit pulses of the different first and second laser beams at the same time or with a time difference.

The reflective mirror 122 reflects the second laser beam output from the second laser generator 114 to the beam combiner 124. The beam combiner 124 generates a combined laser beam by combining the first laser beam and the second laser beam. The beam combiner 124 combines the first laser beam and the second laser beam having different pulse widths to form a channel for performing coaxial transmission/reception.

The sensor 125 measures a time with respect to a light amount of a laser beam passing through a lens. The combined laser beam output from the beam combiner 124 passes through a window and is incident on a shutter 126. The shutter 126 is present between the beam combiner 124 and the first reflective mirror 132 and adjusts the combined laser beam emitted from the beam combiner 124, which is incident on the first reflective mirror 132.

In the rotating polygon mirror 142, when the combined laser beam is incident from the shutter 126, a polygon-shaped mirror having pre-formed multiple facets rotates and reflects the combined laser beam at a preset angle of the multiple facets to vertically emit the combined laser beam.

The multiple facets pre-formed in the rotating polygon mirror 142 are formed with same angle or different angles. When it is determined that the rotation of a hollow motor 180 is required according to the type of object, side angles of the multiple facets pre-formed in the rotating polygon mirror 142 are set to be the same. When it is determined that the rotation of the hollow motor is not required according to the type of object, the side angles of the multiple facets pre-formed in the rotating polygon mirror 142 are set to be different.

A mirror motor (not shown) rotates the rotating polygon mirror (polygon-shaped mirror having multiple facets) 142.

The wedge prism 220 rotates at an angle of 360° or stops to allow a laser beam incident from the rotating polygon mirror 142 to pass through a prism provided therein. The hollow motor 180 horizontally rotates a rotating optics mount 190.

The rotating optics mount 190 rotates at an angle of 360° to horizontally emit the combined laser beam. The rotating optics mount 190 includes the first reflective mirror 132, the light receiving lens 160, the second reflective mirror 134, and the third reflective mirror 136.

The first reflective mirror 132 reflects a laser beam transmitted from the wedge prism 220 in a preset one direction and allows the laser beam to be emitted in any one pattern of a circular pattern, a circular matrix pattern, and a line matrix pattern.

In other words, according to the rotation of the rotating polygon mirror 142 and the wedge prism 220, the first reflective mirror 132 allows the laser beam to be emitted in any one pattern of the circular pattern, the circular matrix pattern, and the line matrix pattern.

The light receiving lens 160 condenses a return laser beam by receiving the return laser beam corresponding to any one of a circular pattern, a circular matrix pattern, and a line matrix pattern from an object positioned in an area in which a laser beam is emitted. An asphere lens or a Fresnel lens may be applied as the light receiving lens 160.

The second reflective mirror 134 reflects the return laser beam condensed from the light receiving lens 160 in a preset direction. The third reflective mirror 136 reflects the return laser beam reflected from the second reflective mirror 134 to a preset area.

A sensing optics mount 230 measures a light amount of the return laser beam reflected from the third reflective mirror 136, measures an image of a waveform of the return laser beam, or measures a distance to an object using a speed of the return laser beam.

The sensing optics mount 230 includes a first splitter (splitter1) 252, a second splitter (splitter2) 254, a reflective mirror 256, the APD 242, the PMT1 232, the PMT2 234, the first filter 233, the second filter 235, and the third filter 243.

The sensing optics mount 230 may be used as a LiDAR sensor applied to the ground and air.

The first splitter 252 distributes the return laser beam to the PMT1 232 through the first filter 233. The second splitter 254 distributes the return laser beam to the PMT2 234 through the second filter 235. The reflective mirror 256 distributes the return laser beam to the APD 242 through the third filter 243.

The APD 242 detects a wavelength corresponding to the first laser beam included in the return laser beam incident from the reflective mirror 256 through the third filter 243. Here, the wavelength corresponding to the first laser beam may be a wavelength of 1,064 nm and may be a wavelength passing through the ground.

The PMT1 232 detects a wavelength corresponding to the second laser beam included in the return laser beam distributed from the first splitter 252. Here, the wavelength corresponding to the second laser beam may be a wavelength of 532 nm and may be a wavelength passing through a depth of water.

The PMT2 234 detects a wavelength corresponding to the second laser beam included in the return laser beam distributed from the second splitter 254. Here, the wavelength corresponding to the second laser beam may be a wavelength of 532 nm and may be a wavelength passing through a depth of water.

The first filter 233 is disposed between the PMT1 232 and the first splitter 252. The first filter 233 performs filtering to transmit only the wavelength of 532 nm corresponding to the second laser beam in the return laser beam distributed from the first splitter 252.

The second filter 235 is disposed between the PMT2 234 and the second splitter 235. The second filter 235 performs filtering to transmit only the wavelength of 532 nm corresponding to the second laser beam in the return laser beam distributed from the second splitter 235.

The third filter 243 is disposed between the APD 242 and the reflective mirror 256. The third filter 243 performs filtering to transmit only the wavelength of 1,064 nm corresponding to the first laser beam in the return laser beam distributed from the reflective mirror 256.

Figure 2A:
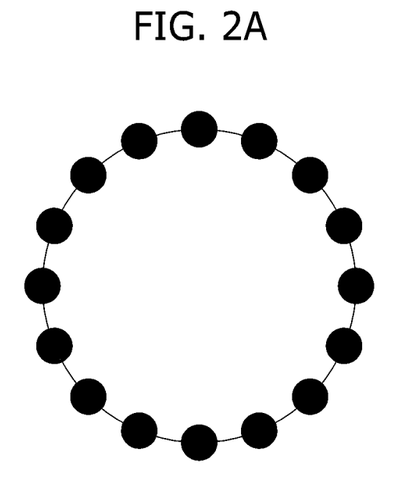
FIGS. 2A, 2B, and 2C shows diagrams illustrating laser beam patterns according to the present embodiment.
Figure 2B:
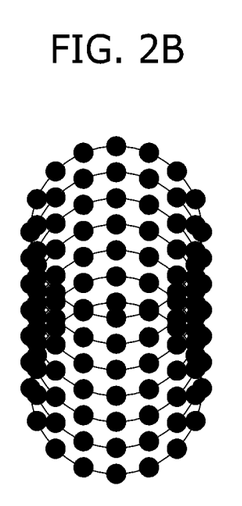
Figure 2C:
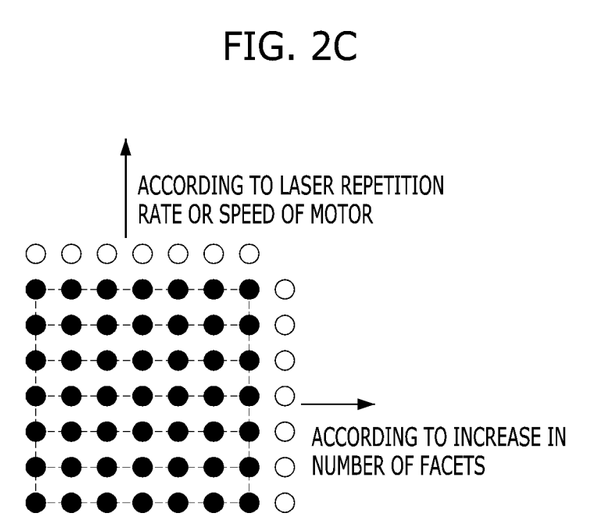

FIGS. 2A, 2B, and 2C shows diagrams illustrating laser beam patterns according to the present embodiment.

In a state in which the rotating polygon mirror 142 stops, when the wedge prism 220 rotates, a laser beam is emitted in a circular pattern shown in FIG. 2A. In a state in which the rotating polygon mirror 142 rotates, when the wedge prism 220 rotates, a laser beam is emitted in a circular matrix pattern shown in FIG. 2B. In a state in which the rotating polygon mirror 142 rotates, when the wedge prism 220 stops, a laser beam is emitted in a line matrix pattern shown in FIG. 2C.

Figure 3:
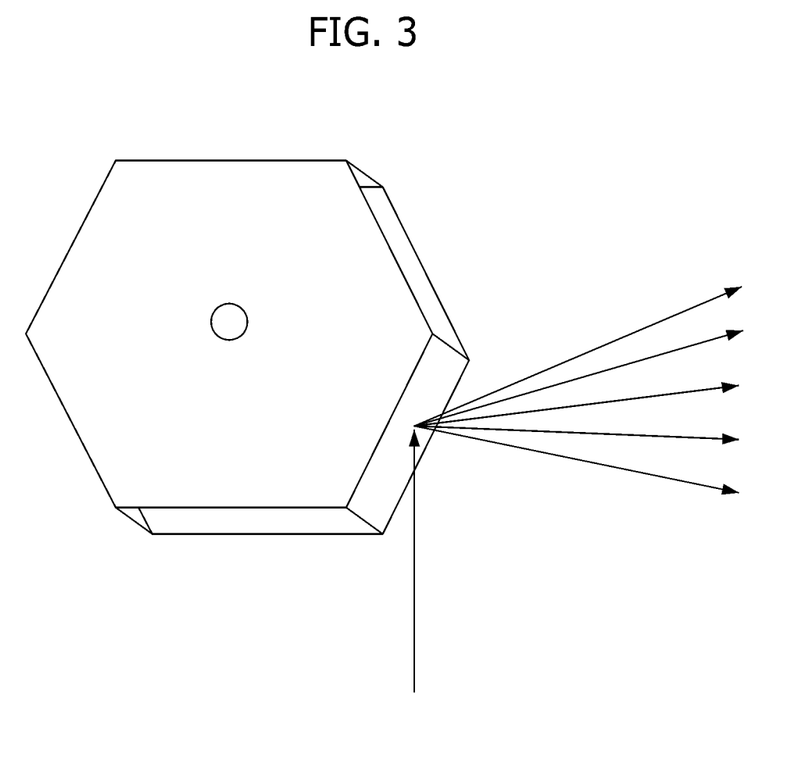
FIG. 3 is a diagram illustrating a rotating polygon mirror according to the present embodiment.

FIG. 3 is a diagram illustrating the rotating polygon mirror according to the present embodiment.

In the LiDAR system 100 according to the present embodiment, the rotating polygon mirror 142 having multiple facets is constructed to provide an optical system in which the number of vertical channels is variable and an interval between spots is arbitrarily adjustable. The LiDAR system 100 uses different optical spheres that are multi-wavelength-coupled to perform coaxial transmission/reception.

The LiDAR system 100 according to the present embodiment allows the rotating optics mount 190 to vertically split a laser beam by using the rotating polygon mirror 142 having multiple facets. The rotating polygon mirror 142 having multiple facets receives a single laser beam source. The rotating polygon mirror 142 having multiple facets rotates to vertically emit one laser source. That is, due to the rotating polygon mirror 142 having multiple facets, one laser source is not split, but one laser pulse is consecutively and vertically emitted without any change.

The polygon-shaped rotating polygon mirror 142 having multiple facets has a preset angle for each facet. When 10,000, 100,000, or one million pulses are emitted per second, the number of channels is determined according to the revolutions per minute (RPMs) for rotating the rotating polygon mirror 142 having multiple facets and the number of the facets of the rotating polygon mirror 142 having multiple facets (synchronizer).

For example, when an area of a laser pulse vertically emitted is a narrow area, since an emission angle should be set to be narrow, only two channels may be used. When an area of a laser pulse vertically emitted is a general area, since an emission angle should be set to be wider than a narrow area, three channels may be used.

As described above, when the number of the channels is determined according to the RPMs for rotating the rotating polygon mirror 142 having multiple facets and the number of the facets of the rotating polygon mirror 142 having multiple facets, the number of the channels may be adjusted with an external trigger (synchronizer).

The rotating polygon mirror 142 having multiple facets may be set to have multiple facets having various angles according to a situation. According to RPMs for rotating the rotating polygon mirror 142 having multiple facets, a polygon-shaped mirror having eight facets may vertically emit laser pulses in eight lines, and as a result, a vertical plane can be scanned.

Accordingly, the LiDAR system 100 according to the present embodiment includes the hollow motor 180 for horizontally rotating the rotating optics mount 190 and the mirror motor for rotating the rotating polygon mirror 142 having multiple facets.

Figure 4:
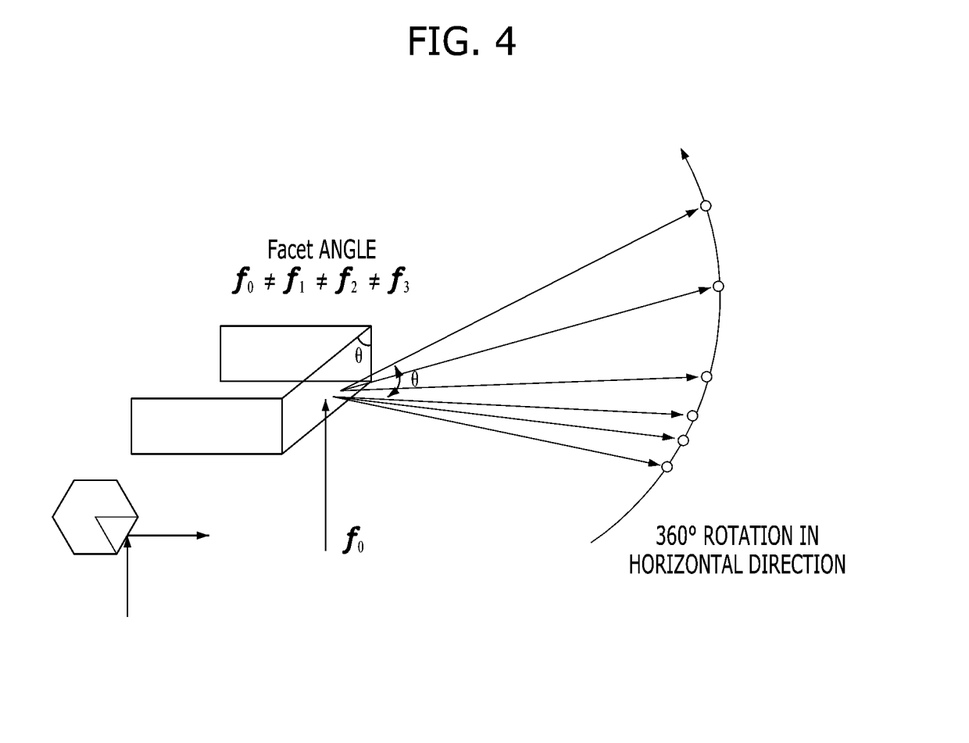
FIG. 4 shows diagrams illustrating a laser beam refracted from a side facet by diversifying a side angle of the rotating polygon mirror according to the present embodiment.

FIG. 4 shows diagrams illustrating a laser beam refracted from a side facet by diversifying a side angle of the rotating polygon mirror according to the present embodiment.

The rotating polygon mirror 142 having multiple facets may vertically transmit a laser beam from one channel (single channel) to a plurality of channels (multi-channel). The rotating polygon mirror 142 may adjust a pitch between spots according to a pulse repetition rate or a scanner speed.

The rotating polygon mirror 142 may select a radiation angle by variously adjusting a vertical angle. In the rotating polygon mirror 142, a circular mirror having multiple facets is attached to the mirror motor and rotated. Facets formed in the rotating polygon mirror 142 maintain the same angle or form different angles to allow beams, which are vertically emitted by the RPMs of the mirror motor, to overlap each other.

A laser beam source is incident into a hole formed in a center of the rotating polygon mirror 142 having multiple facets. The rotating polygon mirror 142 having multiple facets vertically emits a laser beam by rotating according to the number of multiple facets.

The facets formed in the rotating polygon mirror 142 having multiple facets may be variously formed as 4 facets to 90 facets according to a pulse repetition rate per second. As the RPMs for rotating the rotating polygon mirror 142 having facets and multiple facets are increased, a scanning speed is increased, and thus, an amount of acquired information is increased, thereby increasing accuracy.

Resolution can be increased as much as possible by adjusting the RPMs and the facets formed in the rotating polygon mirror 142 having multiple facets. The facets may have the same angle or different angles. For example, when facets form an octahedron or a hexahedron, the facets do not form a regular octahedron or a regular hexahedron.

An incident laser beam is reflected from the multiple facets formed in the rotating polygon mirror 142. In this case, a vertical pitch is determined according to the number of pulses, the number of facets, and the RPMs. For example, the vertical pitch may be determined according to a specification of a laser to be used or may be determined by adjusting RPMs. The number of the pulses is related to the number of rep rate pulses of a laser or RPMs. A vertical line is scanned through one side facet of the rotating polygon mirror 142 having multiple facets.

When side angles of the multiple facets formed in the rotating polygon mirror 142 are set to be different, information about a vertical plane may be collected. That is, only vertical information may be collected by rotating only the rotating polygon mirror without horizontally rotating the rotating optics mount 190.

When homocentric rotation is required, it is to view a vertical plane line by line through the side facet during the homocentric rotation by setting side angles of the multiple facets formed in the rotating polygon mirror 142 to be the same. When homocentric rotation is not required, it is to view a vertical plane, like a face, by adjusting the side angles.

Figure 5:
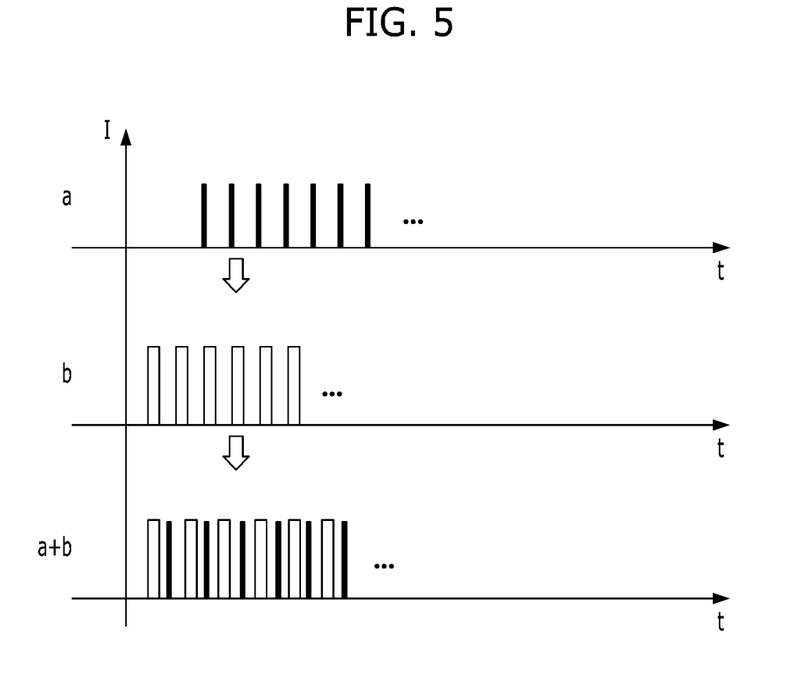
FIG. 5 shows graphs for describing the combining of first and second laser beams according to the present embodiment.

FIG. 5 shows graphs for describing the combining of the first and second laser beams according to the present embodiment.

The LiDAR system 100 may selectively control a laser wavelength and may emit lasers at the same time or with a time difference. The first laser generator 112 and the second laser generator 114 transmit pulses of laser beams having two different wavelengths at the same time or with a time difference.

The LiDAR system 100 according to the present embodiment combines and transmits two or more wavelengths according to use. For example, a reason for combining two different wavelengths is to combine and transmit a wavelength of 532 nm for measuring a depth of a river or a place containing water and an infrared (IR) wavelength of 1,064 nm, 905 nm, or 1,550 nm for measuring a water surface. For example, in order to measure a gas, a wavelength of 532 nm and a mid-IR wavelength of 2,500 nm to 3,000 nm are combined and transmitted.

Figure 6:
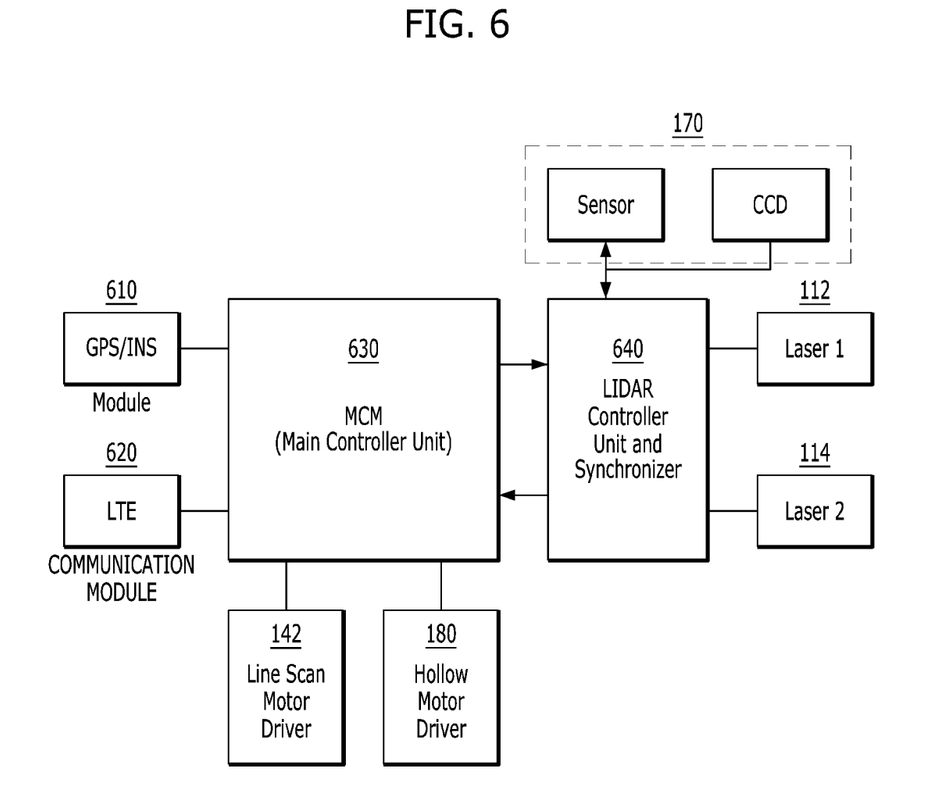
FIG. 6 is a schematic block diagram illustrating a LiDAR system according to the present embodiment.

FIG. 6 is a schematic block diagram illustrating a LiDAR system according to the present embodiment.

A LiDAR system 100 according to the present embodiment includes a GPS 610, a communication module 620, a main controller unit (MCM) 630, a LiDAR controller unit and synchronizer 640, a mirror motor, and a hollow motor 180. Components included in the LiDAR system 100 are not necessarily limited thereto.

The components included in the LiDAR system 100 may be connected to a communication path for connecting software modules or hardware modules inside a device to operate organically with each other. The components perform communication using one or more communication buses or signal lines.

Each component included in the LiDAR system 100 shown in FIG. 6 may refer to a unit for processing at least one function or operation and may be implemented using a hardware module, a software module, or a combination of hardware and software.

The GPS 610 receives navigation data about a current position to generate position information. The communication module 620 is a module that performs communication with an external device and uses a mobile communication network such as long-term evolution (LTE) network or a 5G network, or an Internet network.

The MCM 630 selectively controls wavelengths of a first laser beam and a second laser beam and allows the first and second laser beams to be emitted at the same time or with a time difference.

The MCM 630 combines or debugs a light amount of a return laser beam, an image of a waveform of the return laser beam, and a distance to an object together with position information.

When the number of channels is determined according to RPMs for rotating a rotating polygon mirror 142 and the number of facets of the rotating polygon mirror 142, the LiDAR controller unit and synchronizer 640 adjusts the number of the channels with an external trigger.

The LiDAR controller unit and synchronizer 640 changes the number of vertical channels based on RPMs and the number of multiple facets of the rotating polygon mirror or determines (arbitrarily adjusts) a vertical interval (vertical pitch) between spots according to the number of pulses of first to $N^{th}$ laser beams, the number of the multiple facets, and the RPMs of the rotating polygon mirror.

A mirror motor is connected to the rotating polygon mirror 142 to rotate the rotating polygon mirror (polygon-shaped mirror having multiple facets) 142. The hollow motor 180 is connected to a rotating optics mount 190 to horizontally rotate the rotating optics mount 190.

The above description is merely intended to illustratively describe the technical spirit of the present embodiment, and various changes and modifications can be made by those skilled in the art to which the present embodiment pertains without departing from the essential features of the present embodiment. Therefore, the embodiments are not intended to limit the technical spirit of the present embodiment but are intended to describe the present embodiment. The scope of the technical spirit of the present embodiment is not limited by these embodiments. The scope of protection of the present embodiment should be defined by the accompanying claims and all technical ideas falling within the equivalent scope thereof should be interpreted as being included in the scope of the present embodiment.

What is claimed is:

1. A light detection and ranging (LiDAR) system comprising:
a first laser generator configured to generate a first laser beam having a preset wavelength;
an Nth laser generator configured to generate an Nth laser beam having a wavelength different from a wavelength of the first laser beam;
a beam combiner configured to generate a combined laser beam by combining the first laser beam and the Nth laser beam;
a rotating polygon mirror which includes a polygon-shaped mirror having pre-formed multiple facets and in which, when the laser beam is directly incident from the first laser generator or from the $N^{th}$ laser generator, the polygon-shaped mirror rotates to reflect the laser beam at a present angle of the multiple facets and vertically emit the laser beam;
a wedge prism which rotates at an angle of 360° or stops to transmit the laser beam incident from the rotating polygon mirror;
a first reflective mirror configured to reflect the laser beam transmitted from the wedge prism in a preset one direction and allow the laser beam to be emitted in any one pattern of a circular pattern, a circular matrix pattern, and a line matrix pattern;
a light receiving lens configured to condense a return laser beam by receiving the return laser beam corresponding to any one of the circular pattern, the circular matrix pattern, and the line matrix pattern from an object positioned in an area in which the laser beam is emitted;

a reflective mirror unit configured to reflect the return laser beam condensed from the light receiving lens in a preset one direction;

a rotating optics mount which includes the first reflective mirror, a second reflective mirror configured to reflect the return laser beam condensed from the light receiving lens in a preset direction, and a third reflective mirror configured to reflect the return laser beam reflected from the second reflective mirror to a preset area;

hollow motor connected to the rotating optics mount to horizontally rotate the rotating optics mount at an angle of 360° to horizontally emit the combined laser beam; and a sensing optics mount configured to measure an amount of light from the return laser beam reflected from the third reflective mirror, measure an image corresponding to a waveform of the return laser beam reflected from the third reflective mirror, or measure a distance to the object using a speed of the return laser beam reflected from the third reflective mirror.

2. The LiDAR system of claim 1, further comprising:
a mirror motor configured to rotate the rotating polygon mirror.

3. The LiDAR system of claim 1, wherein the beam combiner couples the first laser beam and the Nth laser beam having different pulse widths to form a channel for performing coaxial transmission/reception.

4. The LiDAR system of claim 1, wherein the first laser generator and the Nth laser generator transmit pulses of the first laser beam and the Nth laser beam, which are different, at the same time or with a time difference.

5. The LiDAR system of claim 1, further comprising a main controller unit (MCM) configured to selectively control wavelengths of first to Nth laser beams to allow the first laser to Nth laser beams to be emitted at the same time or with a time difference.

6. The LiDAR system of claim 5, further comprising a LiDAR controller unit and synchronizer configured to adjust a number of channels with an external trigger when the number of channels is determined according to revolutions per minute (RPMs) for rotating the rotating polygon mirror and a number of the facets of the rotating polygon mirror.

7. The LiDAR system of claim 6, wherein the LiDAR controller unit and synchronizer changes a number of vertical channels based on the RPMs and a number of the multiple facets of the rotating polygon mirror or determines a vertical interval between spots according to a number of the pulses of the first to Nth laser beams, the number of the multiple facets, and the RPMs of the rotating polygon mirror.

8. The LiDAR system of claim 5, further comprising:
a global positioning system (GPS) configured to receive navigation data about a current position to generate position information; and
a communication module configured to communicate with an external device,
wherein the MCM combines or debugs the amount of light from the return laser beam, the image corresponding to the waveform of the return laser beam, and the distance to the object together with the position information.

9. The LiDAR system of claim 1, wherein the multiple facets pre-formed in the rotating polygon mirror are formed with the same angle or different angles such that:

side angles of the multiple facets pre-formed in the rotating polygon mirror are set to be the same when the rotation of the hollow motor is required according to a type of the object; and the side angles of the multiple facets pre-formed in the rotating polygon mirror are set to be different when the rotation of the hollow motor is not required according to a different type of the object.

10. The LiDAR system of claim 1, wherein the first laser generator generates the first laser beam having a wavelength of 905 nm, 1,064 nm, or 1,550 nm, and
a second laser generator generates a second laser beam having a wavelength of 532 nm.

11. The LiDAR system of claim 1, further comprising a shutter present between the beam combiner and the first reflective mirror and configured to adjust the combined laser beam emitted from the beam combiner, which is incident on the first reflective mirror.

12. The LiDAR system of claim 1, wherein the sensing optics mount includes:
a first splitter configured to distribute the return laser beam;
a second splitter configured to distribute the return laser beam passing through the first splitter;
a reflective mirror configured to distribute the return laser beam passing through the second splitter;
a first photo multiplier tube (PMT1) configured to detect a wavelength corresponding to a second laser beam included in the return laser beam distributed from the first splitter;
a second photomultiplier tube (PMT2) configured to detect a wavelength corresponding to the second laser beam included in the return laser beam distributed from the second splitter; and
an avalanche photodetector (APD) configured to detect a wavelength corresponding to the first laser beam included in the return laser beam distributed from the reflective mirror.

13. The LiDAR system of claim 12, further comprising:
a first filter disposed between the PMT1 and the first splitter and configured to perform filtering to transmit only the wavelength corresponding to the second laser beam in the return laser beam distributed from the first splitter;
a second filter disposed between the PMT2 and the second splitter and configured to perform filtering to transmit only the wavelength corresponding to the second laser beam in the return laser beam distributed from the second splitter; and
a third filter disposed between the APD and the reflective mirror and configured to perform filtering to transmit only the wavelength corresponding to the first laser beam in the return laser beam distributed from the reflective mirror.

14. The LiDAR system of claim 1, wherein the laser beam is emitted in any one pattern of the circular pattern, the circular matrix pattern, and the line matrix pattern according to rotation of the rotating polygon mirror and the wedge prism.

15. The LiDAR system of claim 14, wherein, in a state in which the rotating polygon mirror stops, when the wedge prism rotates, the laser beam is emitted in the circular pattern.

16. The LiDAR system of claim 14, wherein, in a state in which the rotating polygon mirror rotates, when the wedge prism rotates, the laser beam is emitted in the circular matrix pattern.

17. The LiDAR system of claim 14, wherein, in a state in which the rotating polygon mirror rotates, when the wedge prism stops, the laser beam is emitted in the line matrix pattern.

18. The LiDAR system of claim 1, wherein the light receiving lens is an asphere lens or a Fresnel lens.

19. The LiDAR system of claim 1, wherein the laser beam reflected by the first reflective mirror passes through a window to be emitted in any one of the circular pattern, the circular matrix pattern, and the line matrix pattern.

20. The LiDAR system of claim 19, wherein the window and the light receiving lens are configured such that the first reflective mirror is used only for emission of the laser beam and the second and third reflective mirrors are used only for reflection of the return laser beam.

\* \* \* \* \*